United States Patent
Mitsuyasu

(10) Patent No.: US 9,816,609 B2
(45) Date of Patent: Nov. 14, 2017

(54) VEHICLE CONTROLLER

(71) Applicant: Toyota Jidosha Kabushiki Kaisha, Toyota-shi, Aichi ken (JP)

(72) Inventor: Masaki Mitsuyasu, Kawasaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/343,443

(22) Filed: Nov. 4, 2016

(65) Prior Publication Data

US 2017/0074394 A1    Mar. 16, 2017

Related U.S. Application Data

(63) Continuation of application No. 14/236,258, filed as application No. PCT/JP2011/068330 on Aug. 10, 2011, now Pat. No. 9,518,654.

(51) Int. Cl.
*F16H 61/14*    (2006.01)
*F16H 63/46*    (2006.01)
*B60W 10/02*    (2006.01)

(52) U.S. Cl.
CPC .......... *F16H 61/143* (2013.01); *F16H 61/14* (2013.01); *F16H 63/46* (2013.01); *B60W 10/026* (2013.01); *B60Y 2300/18083* (2013.01); *F16H 2061/146* (2013.01)

(58) Field of Classification Search
None
See application file for complete search history.

(56) References Cited

U.S. PATENT DOCUMENTS

| | | | |
|---|---|---|---|
| 5,038,286 A | | 8/1991 | Asayama et al. |
| 5,265,499 A | | 11/1993 | Soka |
| 5,460,584 A | | 10/1995 | Kusaka et al. |
| 5,467,854 A | | 11/1995 | Creger et al. |
| 5,669,848 A | * | 9/1997 | Kondo ............... F16H 61/0213 192/3.3 |
| 5,879,266 A | | 3/1999 | Sawamura et al. |
| 6,076,032 A | * | 6/2000 | Kuroda ............... B60W 30/18 477/97 |
| 6,397,703 B1 | | 6/2002 | Iijima |
| 2003/0036458 A1 | | 2/2003 | Tabata et al. |
| 2010/0227734 A1 | * | 9/2010 | Wallner ............... B60K 6/365 477/5 |

FOREIGN PATENT DOCUMENTS

| | | |
|---|---|---|
| JP | 2000-320581 A | 11/2000 |
| JP | 2002-248935 A | 9/2002 |
| JP | 2003-120805 A | 4/2003 |
| JP | 2003-207036 A | 7/2003 |

* cited by examiner

*Primary Examiner* — Colby M Hansen
(74) *Attorney, Agent, or Firm* — Andrews Kurth Kenyon LLP

(57) ABSTRACT

A vehicle controller includes a lock-up clutch disposed to a power transmission path between an engine and a driving wheel, and a clutch configured to connect and disconnect the power transmission path, wherein at the time of switching driven traveling for causing a vehicle to travel by connecting the power transmission path and inertia traveling for causing the vehicle to travel by disconnecting the power transmission path, the lock-up clutch and the clutch are switched at switching start timings different from each other.

7 Claims, 5 Drawing Sheets

VEHICLE CONTROLLER

CROSS-REFERENCE TO RELATED APPLICATIONS

This is a continuation application based on U.S. application Ser. No. 14/236,258, filed on Jan. 30, 2014, which is a national phase application based on the PCT International Patent Application No. PCT/JP2011/068330, filed on Aug. 10, 2011, the entire contents of which are incorporated herein by reference.

FIELD

The present invention relates to a vehicle controller.

BACKGROUND

Conventionally, in a vehicle having a clutch for connecting and disconnecting a power transmission path between an engine and a driving wheel, a technology for releasing the clutch while the vehicle travels is known. For example, Patent Literature 1 discloses a technology of a vehicle power transmission device for refraining from applying engine brake by releasing an input clutch at time of coasting.

CITATION LIST

Patent Literature

Patent Literature 1: Japanese Patent Application Laid-open No. 2003-207036

SUMMARY

Technical Problem

When a power transmission path is connected and disconnected while a vehicle travels, there is a fear that shock is generated by the variation of load. It is desired to be able to suppress the shock generated by the connection and the disconnection of the power transmission path.

An object of the present invention is to provide a vehicle controller capable of suppressing the shock generated by the connection and the disconnection of a power transmission path.

Solution to Problem

A vehicle controller according to the present invention includes a lock-up clutch disposed to a power transmission path between an engine and a driving wheel; and a clutch configured to connect and disconnect the power transmission path, wherein at the time of switching between driven traveling for causing a vehicle to travel by connecting the power transmission path and inertia traveling for causing the vehicle to travel by disconnecting the power transmission path, the lock-up clutch and the clutch are switched at switching start timings different from each other.

In the vehicle controller, it is preferable that at the time of switching from the driven traveling to the inertia traveling, the release start timing of the lock-up clutch is made different from the release start timing of the clutch.

In the vehicle controller, it is preferable that at the time of switching from the driven traveling to the inertia traveling, the release start timing of the lock-up clutch is prior to the release start timing of the clutch.

In the vehicle controller, it is preferable that at the time of switching from the inertia traveling to the driven traveling, the engagement start timing of the clutch is prior to the engagement start timing of the lock-up clutch.

In the vehicle controller, it is preferable that at the time of switching between the driven traveling and the inertia traveling, an auxiliary machine load of the engine is reduced.

Advantageous Effects of Invention

The vehicle controller according to the present invention includes the lock-up clutch disposed to the power transmission path between the engine and the driving wheel and the clutch for connecting and disconnecting the power transmission path, and when driven traveling for causing the vehicle to travel by connecting the power transmission path and inertia traveling for causing the vehicle to travel by disconnecting the power transmission path are switched, the lock-up clutch and the clutch are switched at switching start timings different each other. The vehicle controller according to the present invention can achieve an effect that the shock generated by the connection and the disconnection of the power transmission path can be suppressed.

DESCRIPTION OF EMBODIMENTS

Figure 1:
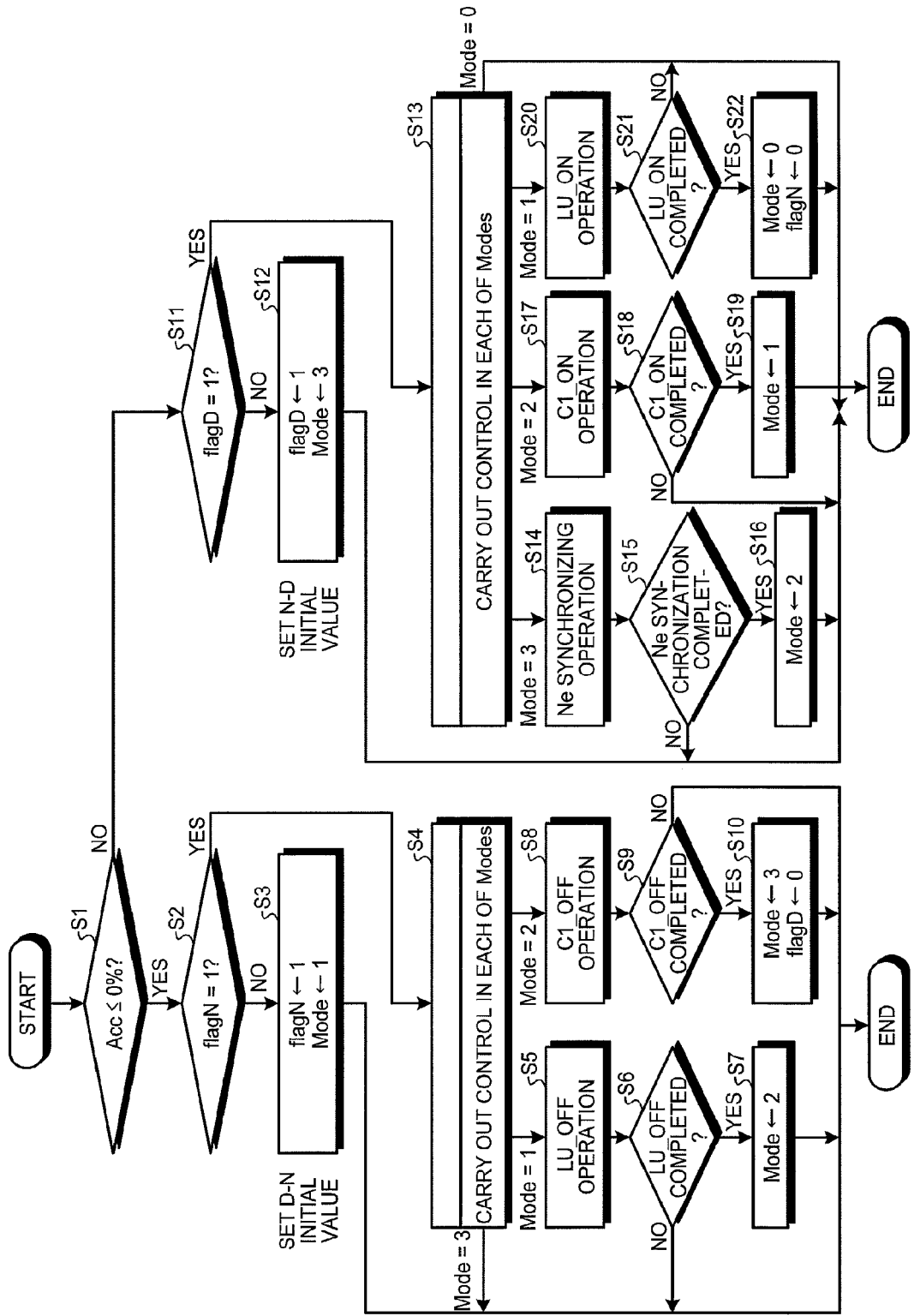
FIG. 1 is a flowchart illustrating an operation of vehicle control according to an embodiment.

A vehicle controller according to an embodiment of the present invention will be explained below in detail referring to the drawings. The present invention is not limited by the embodiment. Further, the components in the embodiment include the components that can be easily arrived by a person skilled in the art or substantially the same components.

Embodiment

An embodiment will be explained referring to FIG. 1 to FIG. 3. The embodiment relates to a vehicle controller. FIG. 1 is a flowchart illustrating an operation of vehicle control according to the embodiment of the present invention, FIG. 2 is a schematic configuration view of a vehicle to which the vehicle controller according to the embodiment is applied, and FIG. 3 is a time chart according to the embodiment.

Figure 2:
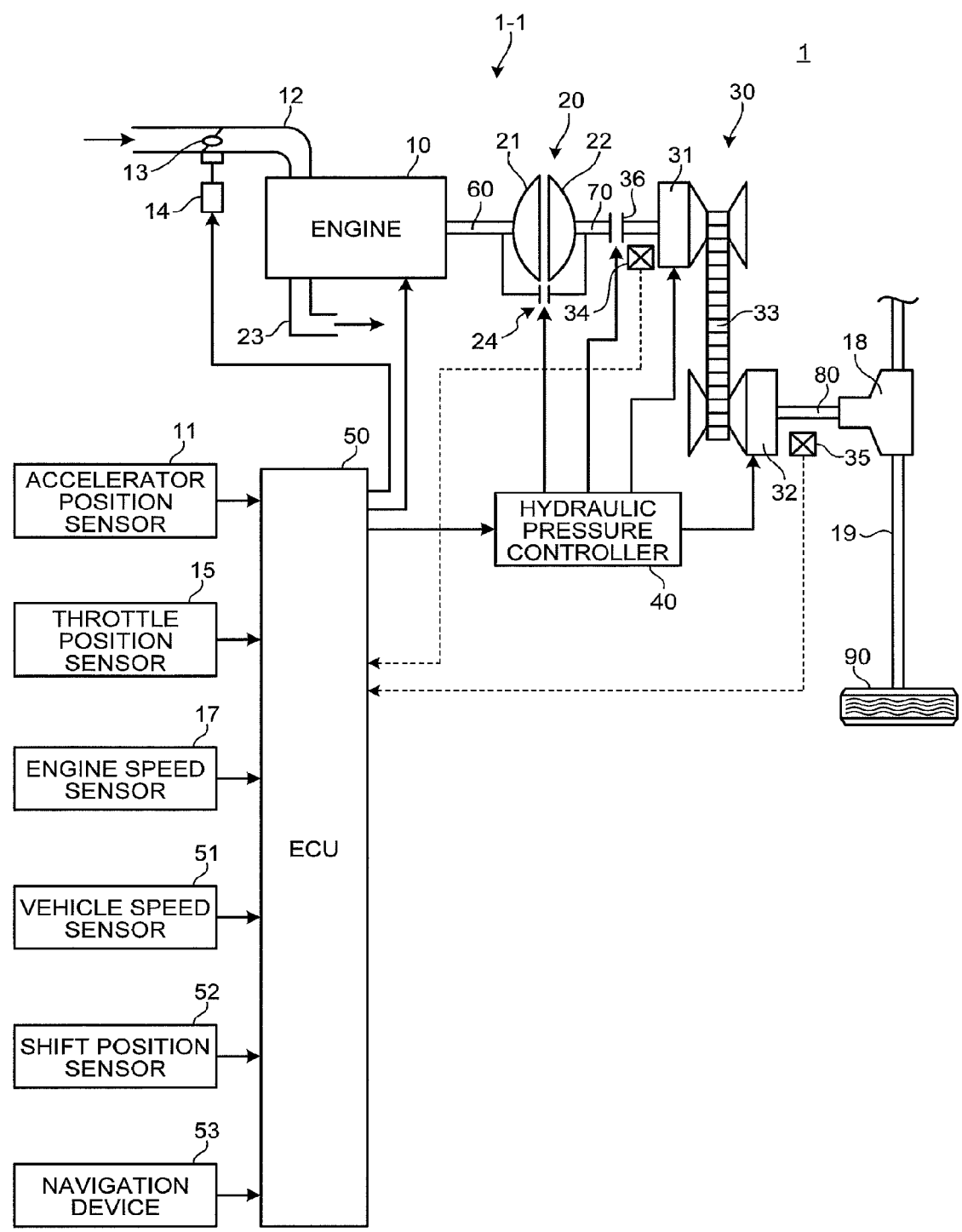
FIG. 2 is a schematic configuration view of a vehicle according to the embodiment.
Figure 3:
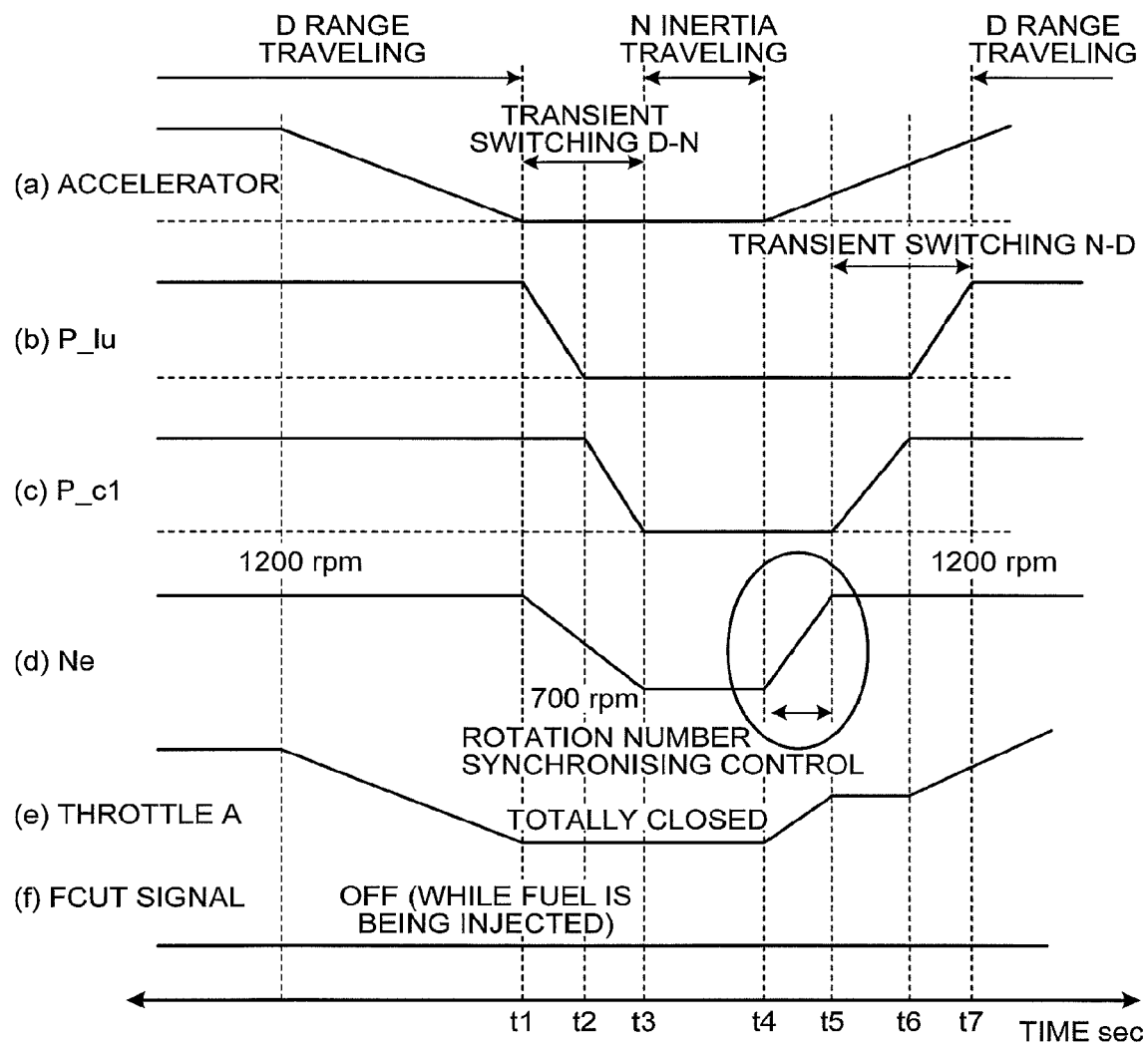
FIG. 3 is a time chart according to the embodiment.

In FIG. 2, sign 1 illustrates the vehicle. The power train of the vehicle 1 includes an engine 10 as a power source, a torque converter 20, and a continuously variable transmission 30. The engine 10 as an internal combustion engine is coupled with the continuously variable transmission (CVT) 30 as an automatic transmission via the torque converter 20. The engine output torque (power) of the engine 10 is input from an engine output shaft 60 to the continuously variable transmission 30 via the torque converter 20 and transmitted to a driving wheel 90 via a differential gear 18 and a drive shaft 19.

The torque converter 20 has a pump impeller 21 connected to the engine output shaft 60 and a turbine runner 22 connected to an input shaft 70 of the continuously variable transmission 30. The pump impeller 21 is an input member input with the power from the engine 10 in the torque converter 20. The turbine runner 22 is an output member for outputting the power input from the engine 10 in the torque converter 20.

The torque converter 20 can transmit the power between the pump impeller 21 and the turbine runner 22 via a working fluid. The torque converter 20 has a lock-up clutch 24. The lock-up clutch 24 is a friction-engagement type clutch device disposed to a power transmission path between the engine 10 and the driving wheel 90. The lock-up clutch 24 can connect the engine output shaft 60 and the input shaft 70 without via the working fluid. When the lock-up clutch 24 is released, the torque converter 20 can transmit the power by the engine output shaft 60 and the input shaft 70 via the working fluid, whereas when the lock-up clutch 24 is engaged, the pump impeller 21 is directly coupled with the turbine runner 22 so that the power can be directly transmitted by the engine output shaft 60 and the input shaft 70 without via the working fluid.

The continuously variable transmission 30 is, for example, a known belt type continuously variable transmission. The continuously variable transmission 30 has a primary pulley 31 disposed to the engine 10 side, a secondary pulley 32 disposed to the driving wheel 90 side, a belt 33, and a clutch 36. The primary pulley 31 is coupled with the input shaft 70. The secondary pulley 32 is coupled with an output shaft 80 connected to a differential gear 18. The belt 33 is stretched between the primary pulley 31 and the secondary pulley 32.

The clutch 36 is disposed to the input shaft 70 and disposed in series to the lock-up clutch 24 in the power transmission path. The clutch 36 has a function for connecting and disconnecting the power transmission path between the engine 10 and the driving wheel 90. The clutch 36 has an engine side engaging element coupled with the engine 10 side in the input shaft 70 and a driving wheel side engaging element coupled with the driving wheel 90 side. The clutch 36 can connect the power transmission path between the engine 10 and the driving wheel 90 by engaging the engine side engaging element with the driving wheel side engaging element. In contrast, releasing the clutch 36 can disconnect the power transmission path between the engine 10 and the driving wheel 90. In other words, the clutch 36 functions as a switching device for switching a power transmission possible state and a power transmission impossible state in the power transmission path between the engine 10 and the driving wheel 90. In the description, the clutch 36 is also described "C1 clutch".

A hydraulic pressure controller 40 has a function for supplying a hydraulic pressure to the torque converter 20, the clutch 36, the primary pulley 31, and the secondary pulley 32. The hydraulic pressure controller 40 changes the gear ratio of the continuously variable transmission 30 in response to a gear ratio change command input from an ECU 50. The hydraulic pressure controller 40 can control the gear ratio and a gear shift speed by the flow-in/flow-out control of the hydraulic pressure to a primary pulley side actuator. The adjustment of the hydraulic pressure of the primary pulley side actuator can change the gear ratio steplessly by changing a pulley ratio. Further, the hydraulic pressure controller 40 can control a belt clamping pressure by controlling the hydraulic pressure of a secondary pulley side actuator.

The hydraulic pressure controller 40 can not only control the release/engagement of the lock-up clutch 24 of the torque converter 20 but also can control the degree of engagement of the lock-up clutch 24. The hydraulic pressure controller 40 can control the torque capacity of the lock-up clutch 24 by adjusting the hydraulic pressure supplied to the lock-up clutch 24. When the lock-up clutch 24 is engaged or released, the ECU 50 can carry out the slip control of the lock-up clutch 24 by the hydraulic pressure controller 40. When the ECU 50 engages the lock-up clutch 24 in a released state, the ECU 50 can perfectly engage the lock-up clutch 24 after having engaged it in a predetermined slip state. Further, when the ECU 50 releases the lock-up clutch 24 in a perfectly engaged state, the ECU 50 can release the lock-up clutch 24 after having placed it in a predetermined slip state. In slip control, the hydraulic pressure supplied to the lock-up clutch 24 is controlled to use, for example, the rotation number difference between the rotation number of the engine and the rotation number of the turbine runner 22 (turbine rotation number) as a target value.

The hydraulic pressure controller 40 can control the release/engagement of the clutch 36. The hydraulic pressure controller 40 can switch the released state and the engaged state of the clutch 36 by controlling the hydraulic pressure supplied to the clutch 36. The hydraulic pressure controller 40 may have a function for controlling the degree of engagement of the clutch 36.

The continuously variable transmission 30 is provided with a primary pulley rotation sensor 34 for detecting the rotation number (primary rotation number Nin) of the primary pulley 31 and a secondary pulley rotation sensor 35 for detecting the rotation number (secondary rotation number Nout) of the secondary pulley 32, and the detected the primary rotation number Nin and secondary speed Nout are output to the ECU 50.

The vehicle 1 is provided with the ECU 50 for controlling the engine 10, the continuously variable transmission 30, and the like. The ECU 50 is an electronic control unit having a computer. The ECU 50 has a function for comprehensively controlling the engine 10, the torque converter 20, and the continuously variable transmission 30 (the hydraulic pressure controller 40). A vehicle controller 1-1 of the embodiment includes the lock-up clutch 24, the clutch 36, the hydraulic pressure controller 40, and the ECU 50.

The vehicle 1 is provided with an accelerator position sensor 11 for detecting the operation amount (the accelerator opening degree) of an accelerator pedal, and the detected accelerator opening degree is output to the ECU 50. An intake pipe 12 of the engine 10 is provided with an electronic throttle valve 13 which can be opened and closed by a throttle actuator 14. The ECU 50 can control a throttle opening degree to an arbitrary opening degree regardless of the accelerator opening degree by driving the electronic throttle valve 13 by the throttle actuator 14. The vehicle 1 is provided with a throttle position sensor 15 for detecting the totally-closed state and the throttle opening degree of the electronic throttle valve 13, and the detected throttle opening degree is output to the ECU 50. Sign 23 illustrates an exhaust pipe of the engine 10. The engine 10 is provided with an engine speed sensor 17 for detecting an engine speed (an engine rotation speed), and the detected engine speed is output to the ECU 50. Further, the vehicle 1 is provided with a vehicle speed sensor 51 for detecting a vehicle travel speed and a shift position sensor 52 for detecting the position of a shift lever operated by a driver, and the detected vehicle speed and shift position are output to the ECU 50.

A navigation device 53 has a basic function for guiding a driver's own vehicle to a predetermined destination and is provided with a controller, an operation unit, a position detector, a map database, a drive history recording unit, and the like. The controller of the navigation device 53 is connected to the ECU 50 and can bi-directionally communicate with the ECU 50. The map database of the navigation device 53 stores the information necessary for the vehicle 1 to travel (a map, a straight road, a curved road, an ascending/descending slope, a highway, and the like). The ECU 50 can obtain the information relating to a travel road such as a gradient and a curve based on the information of the present position data obtained from the navigation device 53 and the map database.

The ECU 50 determines a fuel injection amount, injection timing, and ignition timing based on the operating state of the engine 10 such as the engine speed, an intake air amount, and the throttle opening degree and controls an injector and an ignition plug. Further, the ECU 50 has a gear shift map, determines the gear ratio of the continuously variable transmission 30 based on the throttle opening degree and the vehicle speed, and controls the hydraulic pressure controller 40 so that the determined gear ratio is established.

At the time of deceleration of the vehicle 1 or the like, the ECU 50 can carry out inertia traveling for causing the vehicle 1 to travel by disconnecting the power transmission path between the engine 10 and the driving wheel 90 by the clutch 36. The inertia traveling corresponds to that the vehicle 1 is caused to travel by placing the continuously variable transmission 30 at a neutral position. In the description, the inertia traveling is described also as "N coasting". The inertia traveling is carried out when, for example, the accelerator is totally closed with its accelerator opening degree set to 0 and when the accelerator opening degree is set to a predetermined opening degree or less. In addition to the case that the accelerator opening degree is totally closed, also when the accelerator opening degree is equal to or less than the predetermined opening degree, fuel economy can be improved by the shift to the inertia traveling by releasing the clutch 36. For example, at time of high vehicle speed, since the engine speed is high and engine friction is large, travel resistance is high. Thus, the vehicle travels steadily or is decelerated with the accelerator pedal somewhat pressed. When the above traveling state shifts to the inertia traveling and the clutch 36 is released, since the engine speed is reduced to an idle rotation number, the fuel economy is suppressed and the travel resistance (an engine brake force) is reduced so that the fuel economy can be improved.

Note that, in addition to the time of deceleration, the inertia traveling may be carried out when the vehicle 1 can travel at a constant speed in the state that the clutch 36 is engaged. In other words, the inertia traveling may be carried out when the vehicle 1 is not accelerated. The inertia traveling of the embodiment can be carried out at the accelerator opening degree at which the engine 10 is in a driven state in which it is driven by the driving wheel 90 or at the accelerator opening degree at which the engine 10 is not in the driving state and drives the driving wheel 90.

Further, the inertia traveling may be carried out when the vehicle 1 is gently accelerated on a descending slope in the state that the clutch 36 is engaged. Specifically, the inertia traveling can be appropriately carried out according to an accelerator opening degree and a traveling condition.

During the inertia traveling, the ECU 50 causes the engine 10 to operate in an idle state. Specifically, during the inertia traveling, the engine 10 consumes fuel in the amount necessary for the engine to rotate by itself. When the accelerator is pressed during the inertia traveling, the ECU 50 returns the vehicle 1 from the inertia traveling by engaging the clutch 36. With the operation, acceleration can be carried out by the power of the engine 10.

In the inertia traveling, the engine 10 is isolated from the driving wheel 90 and does not act as a load to the driving wheel 90. In the inertia traveling, since deceleration is made smaller than the case that the vehicle travels by engaging the clutch 36, a speed reduction is suppressed. As a result, since an opportunity for carrying out an operation for pressing the accelerator for re-acceleration is reduced, the fuel economy for acceleration is suppressed.

The inertia traveling is carried out in the travel environment and the traveling condition in which it is predicted, for example, that when the vehicle travels in the same section, the amount of fuel economy is smaller in the inertia traveling than the traveling carried out with the clutch 36 engaged. As an example, on a gently ascending slope, whether or not the shift to the inertia traveling is carried out is determined based on the accelerator opening degree, the magnitude of a gradient, the vehicle speed and the like.

Shock and vibration may be generated when driven traveling in which the vehicle 1 is caused to travel by connecting the power transmission path between the engine 10 and the driving wheel 90 and inertia traveling are switched. When, for example, the driven traveling is shifted to the inertia traveling by releasing the clutch 36, shock (a feeling of rushing out and a feeling of acceleration) may be generated because a travel driving force is largely different therebetween. Further, in the drive system between the engine 10 and the driving wheel 90, since releasing the clutch 36 quickly reduces resistance from a large resistance value before the release of the clutch 36, there is a fear that vibration and shock are generated by the load changing force acting as a vibration generating force. For example, there is a fear that shock and vibration are generated by isolating the engine 10, which has acted as the load up to that time, by releasing the clutch 36.

When the inertia traveling is switched to the driven traveling, shock and vibration may be generated. When, for example, the inertia traveling is shifted to the driven traveling by engaging the clutch 36, there is a fear that shock is generated due to a large difference between the travel driving forces thereof. Further, there is a fear that vibration and shock are generated by the rapid increase of the resistance due to the engagement of the clutch 36.

When the driven traveling and the inertia traveling are switched, the vehicle controller 1-1 of the embodiment switches the lock-up clutch 24 and the clutch 36 at switching start timings different each other. Making the switching start timing of the lock-up clutch 24 different from the switching start timing of the clutch 36 can suppress the generation of shock by gradually changing the load of the engine 10 to the driving wheel 90.

The switching start timing when the driven traveling is switched to the inertia traveling is the release start timing of each of the lock-up clutch 24 and the clutch 36. The release start timing is the timing at which the lock-up clutch 24 and the clutch 36 each in an engaged state start to be released and may be set to, for example, the timing at which a release command starts to be output to the hydraulic pressure controller 40, the timing at which the supplied hydraulic pressure starts to change based on the release command, and the timing at which the lock-up clutch 24 and the clutch 36 start to be actually released. The embodiment will be explained assuming that the timing at which the release command is output is the release start timing. When the release command starts to be output to the lock-up clutch 24 and the clutch 36 at different timing, it is assumed that a clutch, to which the release command starts to be output first, starts to be released first.

When the driven traveling is switched to the inertia traveling, making the release start timing of the lock-up clutch 24 different from the release start timing of the clutch 36 can suppress shock by gradually changing the load. Note that the engaged state of the lock-up clutch 24 and the clutch 36 before they start to be released is not limited to the perfectly engaged state and may be a semi-engaged state (a slip engaged state).

In the embodiment, when the driven traveling is switched to the inertia traveling, the release start timing of the lock-up clutch 24 is prior to the release start timing of the clutch 36. Starting the release of the lock-up clutch 24 first reduces the degree of engagement of the lock-up clutch 24 first. The operation reduces the engine load to the driving wheel 90. Specifically, since the state that an engine brake is unlikely to work occurs, the driving force generated to the driving wheel 90 becomes a driving force between the driving force when the lock-up clutch 24 and the clutch 36 are perfectly engaged and the driving force when the clutch 36 is released. Thereafter, starting the release of the clutch 36 reduces the variation of load due to the shift to the inertia traveling. Further, the reduction of the degree of engagement of the lock-up clutch 24 at time of release of the clutch 36 causes the torque converter 20 to absorb shock and vibration. In, for example, the fluid transmission state in which the lock-up clutch 24 is released, shock and vibration are likely absorbed by a working fluid.

In contrast, the switching start timing when the inertia traveling is switched to the driven traveling is the engagement start timing of each of the lock-up clutch 24 and the clutch 36. The engagement start timing is the timing at which the lock-up clutch 24 and the clutch 36 each in a released state start to be engaged and may be set to, for example, the timing at which an engagement command starts to be output to the hydraulic pressure controller 40, the timing at which the supplied hydraulic pressure starts to change based on the engagement command, and the timing at which the lock-up clutch 24 and the clutch 36 starts to be actually engaged. The embodiment will be explained assuming that the timing at which the engagement command starts to be output is the engagement start timing. When the engagement command starts to be output to the lock-up clutch 24 and the clutch 36 at different timing, it is assumed that a clutch to which the engagement command starts to be output first starts to be engaged first.

When the inertia traveling is switched to the driven traveling, making the engagement start timing of the lock-up clutch 24 different from the engagement start timing of the clutch 36 can suppress shock by gradually changing the load.

In the embodiment, when the inertia traveling is switched to the driven traveling, the engagement start timing of the clutch 36 is prior to the engagement start timing of the lock-up clutch 24. Starting the engagement of the clutch 36 in the state that the lock-up clutch 24 is released can suppress the rapid change of the load to the driving wheel 90 at time of switching of the clutch 36. Further, shock and vibration are absorbed by the torque converter 20.

Referring to FIG. 1 and FIG. 3, the vehicle control of the embodiment will be explained. In FIG. 3, (a) illustrates the accelerator opening degree, (b) illustrates the hydraulic pressure supplied to the lock-up clutch 24 (hereinafter, simply described as "a lock-up supply hydraulic pressure") P_lu, (c) illustrates the hydraulic pressure supplied to the clutch 36 (hereinafter, simply described as "a clutch supply hydraulic pressure") P_c1, (d) illustrates the engine speed, (e) illustrates the throttle opening degree, and (f) illustrates a fuel cut signal, respectively.

The control flow illustrated in FIG. 1 is repeatedly carried out while the vehicle 1 travels and repeatedly carried out at, for example, predetermined intervals. First, at step S1, the ECU 50 determines whether or not the accelerator opening degree Acc is 0% or less. As a result of determination, when it is determined that the accelerator opening degree Acc is 0% or less (step S1-Y), a process goes to step S2, and otherwise (step S1-N), the process goes to step S11. Note that, at step S1, an affirmative determination may be made when the condition that the accelerator opening degree Acc is equal to or less than a predetermined opening degree is satisfied in place of the condition that the accelerator opening degree Acc is 0% or less. The predetermined opening degree can be determined in the range of, for example, the accelerator opening degree Acc at which the vehicle 1 is decelerated.

At step S2, the ECU 50 determines whether or not an N coasting control flag flagN is 1. The N coasting control flag flagN is set to 1 while the inertia traveling is carried out. The N coasting control flag flagN is set to 1 when an inertia traveling carrying out condition has been established during the driven traveling, whereas when the inertia traveling has been finished and shifted to the driven traveling, the N coasting control flag flagN is set to 0. As a result of determination at step S2, when it is determined that the N coasting control flag flagN is 1 (step S2-Y), the process goes to step S4, otherwise (step S2-N), the process goes to step S3.

At step S3, the ECU 50 sets an initial value for shifting from the driven traveling to the inertia traveling. The ECU 50 sets the N coasting control flag flagN to 1 and sets an N coasting shift Mode to 1. The N coasting shift Mode changes as the shift motion to the inertia traveling progresses. The Mode is set to 1 until the lock-up clutch 24 has been released. When the lock-up clutch 24 has been released, the Mode is changed to 2 and the clutch 36 is released. When the clutch 36 has been released, the Mode is set to 3 and the shift to the inertia traveling has been completed. When step S3 is carried out, the control flow is finished.

At step S4, the ECU 50 carries out control of each of the N coasting shift Modes. When the N coasting shift Mode is set to 1, the process goes to step S5. When the Mode is 2, the process goes to step S8. Further, when the Mode is 3, the control flow is finished.

At step S5, the ECU 50 carries out the release operation of the lock-up clutch 24. The ECU 50 outputs a release command LU_OFF of the lock-up clutch 24 to the hydraulic pressure controller 40. The hydraulic pressure controller 40 reduces a lock-up supply hydraulic pressure P_lu based on the release command LU_OFF. The reducing speed of the lock-up supply hydraulic pressure P_lu at time can be set to a predetermined speed. In FIG. 3, the release operation of the lock-up clutch 24 is carried out from time t1 to time t2. When step S5 is carried out, the process goes to step S6.

At step S6, the ECU 50 determines whether or not the release operation of the lock-up clutch 24 has been completed. The ECU 50 can determine step S6 based on, for example, the rotation number difference between the engine speed and the turbine rotation number. As a result of determination at step S6, when it is determined that the release operation of the lock-up clutch 24 has been completed (step S6-Y), the process goes to step S7, otherwise (step S6-N), the control flow is finished.

At step S7, the ECU 50 sets the N coasting shift Mode to 2. When step S7 is carried out, the control flow is finished.

At step S8, the ECU 50 carries out the release operation of the clutch 36 (the C1 clutch). The ECU 50 outputs a release command C1_OFF of the clutch 36 to the hydraulic pressure controller 40. The hydraulic pressure controller 40 reduces the clutch supply hydraulic pressure P_c1 based on the release command C1_OFF. The reducing speed of the clutch supply hydraulic pressure P_c1 at the time can be set to a predetermined speed. In FIG. 3, the release operation of the clutch 36 is carried out from time t2 to time t3. When step S8 is carried out, the process goes to step S9.

At step S9, the ECU 50 determines whether or not the release operation of the clutch 36 has been completed. As a result of determination at step S9, when it is determined that the release operation of the clutch 36 has been completed (step S9-Y), the process goes to step S10, otherwise (step S9-N), the control flow is finished.

At step S10, the ECU 50 sets the N coasting shift Mode to 3 and a D range control flag flagD to 0. The D range control flag flagD is set to 1 while the driven traveling is carried out. When the inertia traveling is started, the D range control flag flagD is set to 0, and when the inertia traveling has been finished and shifted to the driven traveling, the D range control flag flagD is set to 1. Note that, in addition to the D range, the inertia traveling can be carried out also when other forward travel range is selected. During the inertia traveling, when the inertia traveling returns to the driven traveling according to the accelerator opening degree Acc, the driven traveling is resumed in a travel state according to respective ranges. When step S10 is carried out, the control flow is finished.

At step S11, the ECU 50 determines whether or not the D range control flag flagD is 1. As a result of determination, when it is determined that the D range control flag flagD is 1 (step S11-Y), the process goes to step S13, otherwise (step S11-N), the process goes to step S12.

At step S12, the ECU 50 sets the D range control flag flagD to 1 and sets an N coasting return Mode to 3. The N coasting return Mode changes as the return motion from the inertia traveling to the driven traveling progresses. In the embodiment, the N coasting return Mode is set to 3 until rotation number synchronizing control to be described later has been completed. When the rotation number synchronizing control has been completed, the Mode is changed to 2 and the engaging operation of the clutch 36 is carried out. When the clutch 36 has been engaged, Mode is set to 1 and the lock-up clutch 24 is engaged. When the lock-up clutch 24 has been engaged, the Mode is set to 0 and the return from the inertia traveling has been completed. When step S12 is carried out, the control flow is finished.

At step S13, the ECU 50 carries out control in each of the N coasting return Modes. When the N coasting return Mode is 3, the process goes to step S14. When the Mode is 2, the process goes to step S17. When the Mode is 1, the process goes to step S20. Further, when the Mode is 0, the control flow is finished.

At step S14, the ECU 50 carries out an rotation number synchronizing operation. The rotation number synchronizing operation is rotation number synchronizing control for synchronizing the engine speed Ne with the primary rotation number Nin. In the rotation number synchronizing operation, the engine speed Ne is caused to approach the primary rotation number Nin by, for example, increasing the engine speed Ne by increasing the fuel injection amount of the engine 10. In FIG. 3, the rotation number synchronizing control is carried out from time t4 to time t5. When step S14 is carried out, the process goes to step S15.

At step S15, the ECU 50 determines whether or not the rotation numbers have been synchronized. The ECU 50 can determine step S15 based on the difference rotation between the engine speed Ne and the primary rotation number Nin. As a result of determination at step S15, when it is determined that the rotation numbers have been synchronized (step S15-Y), the process goes to step S16, otherwise (step S15-N), the control flow is finished.

At step S16, the ECU 50 sets the N coasting return Mode to 2. When step S16 is carried out, the control flow is finished.

At step S17, the ECU 50 carries out the engaging operation of the clutch 36. The ECU 50 outputs an engagement command C1_ON of the clutch 36 to the hydraulic pressure controller 40. The hydraulic pressure controller 40 increases the clutch supply hydraulic pressure P_c1 based on the engagement command C1_ON. In FIG. 3, the engaging operation of the clutch 36 is carried out from time t5 to time t6. When step S17 is carried out, the process goes to step S18.

At step S18, the ECU 50 determines whether or not the clutch 36 has been engaged. The ECU 50 can determine step S18 based on, for example, the rotation number difference between the turbine rotation number and the primary rotation number Nin. As a result of determination at step S18, when it is determined that the clutch 36 has been engaged (step S18-Y), the process goes to step S19, otherwise (step S18-N), the control flow is finished.

At step S19, the ECU 50 sets the N coasting return Mode to 1. When step S19 is carried out, the control flow is finished.

At step S20, the ECU 50 carries out the engaging operation of the lock-up clutch 24. The ECU 50 outputs an engagement command LU_ON of the lock-up clutch 24 to the hydraulic pressure controller 40. The hydraulic pressure controller 40 increases the lock-up supply hydraulic pressure P_lu based on the engagement command LU_ON. In FIG. 3, the engaging operation of the lock-up clutch 24 is carried out from time t6 to time t7. When step S20 is carried out, the process goes to step S21.

At step S21, the ECU 50 determines whether or not the lock-up clutch 24 has been engaged. The ECU 50 can determine step S21 based on the rotation number difference between the engine speed Ne and the turbine rotation number. As a result of determination at step 21, when it is determined that the lock-up clutch 24 has been engaged (step S21-Y), the process goes to step S22, otherwise (step S21-N), the control flow is finished.

At step S22, the ECU 50 sets the N coasting return Mode to 0 and sets the N coasting control flag flagN to 0. When step S22 is carried out, the control flow is finished.

According to the vehicle controller 1-1 of the embodiment, when the driven traveling is switched to the inertia traveling, first, the lock-up clutch 24 is released and subsequently the clutch 36 is released, thereby gradually reducing the load due to the engine 10. With the operation, the rapid change of the load when the power transmission path between the engine 10 and the driving wheel 90 is disconnected is suppressed so that shock can be reduced. Note that, in the embodiment, although the release operation of the clutch 36 is started after the lock-up clutch 24 has been released, the embodiment is not limited thereto. The timing at which the clutch 36 starts to be released may be after the start of release operation of the lock-up clutch 24 and before the completion of release of the lock-up clutch 24. For example, the period before the lock-up clutch 24 has been released may somewhat overlap the period after the release operation of the clutch 36 has started.

According to the vehicle controller 1-1 of the embodiment, when the inertia traveling is switched to the driven traveling, the clutch 36 and the lock-up clutch 24 are engaged after the engine speed Ne has been synchronized with the primary rotation number Nin. The shock when the clutch 36 is engaged is suppressed by the rotation number synchronizing control. Further, since the lock-up clutch 24 is engaged after the clutch 36 has been engaged, the rapid change of the load when the power transmission path between the engine 10 and the driving wheel 90 is connected is suppressed. Thus, the load due to the engine 10 can be caused to gradually act on the driving wheel 90, which can suppress shock.

Note that, in the embodiment, although the engaging operation of the clutch 36 is started after the rotation number synchronizing control has been completed and the engaging operation of the lock-up clutch 24 is started after the clutch 36 has been engaged, the timing of the respective operations is not limited thereto. For example, the start timing of the engaging operation of the clutch 36 may be after the start of the rotation number synchronizing control and before the completion of the rotation number synchronizing control. For example, the period before the rotation number synchronizing control has completed may somewhat overlap the period after the engaging operation of the clutch 36 has started. Further, the engagement start timing of the lock-up clutch 24 may be after the engaging operation of the clutch 36 has started and before the engaging operation has completed. For example, the period before the clutch 36 has been engaged may somewhat overlap the period after the engaging operation of the lock-up clutch 24 has started.

Note that, in the embodiment, although the transmission of the vehicle 1 is the continuously variable transmission 30, the embodiment is not limited thereto. A stepped automatic transmission may be mounted in place of the continuously variable transmission 30 or other known transmission and transmission mechanism may be mounted.

In the embodiment, although the clutch 36, which connects and disconnects the power transmission path between the engine 10 and the driving wheel 90, is disposed to the input shaft 70, the disposition of the clutch 36 is not limited thereto. For example, the clutch 36 may be disposed to other location of the power transmission path.

In the embodiment, although fuel is continuously injected to the engine 10 and the engine 10 is driven in the inertia traveling, the embodiment is not limited thereto. For example, the fuel injection to the engine 10 may be stopped in the inertia traveling.

The clutches, which are switched between the engaged state and the released state at the time the driven traveling and the inertia traveling are switched, are not limited to the two clutches of the clutch 36 and the lock-up clutch 24. Further, other clutch device may be engaged or released at the time the driven traveling and the inertia traveling are switched. The other clutch device is disposed to the power transmission path between the engine 10 and the driving wheel 90 and preferably switched at switching start timing different from the switching start timing of any of the clutch 36 and the lock-up clutch 24.

First Modification of Embodiment

A first modification of the embodiment will be explained. In the modification, quick control is carried out to advance the timing at which the shift from the inertia traveling to the driven traveling is completed. Specifically, at the time the inertia traveling is shifted to the driven traveling, the engaging operation of the clutch 36 and the engaging operation of the lock-up clutch 24 are carried out approximately at the same time. The simultaneous engagement of the clutch 36 and the lock-up clutch 24 after the completion of the rotation number synchronizing control can result in the excellent responsiveness of the shift to the driven traveling.

Figure 4:
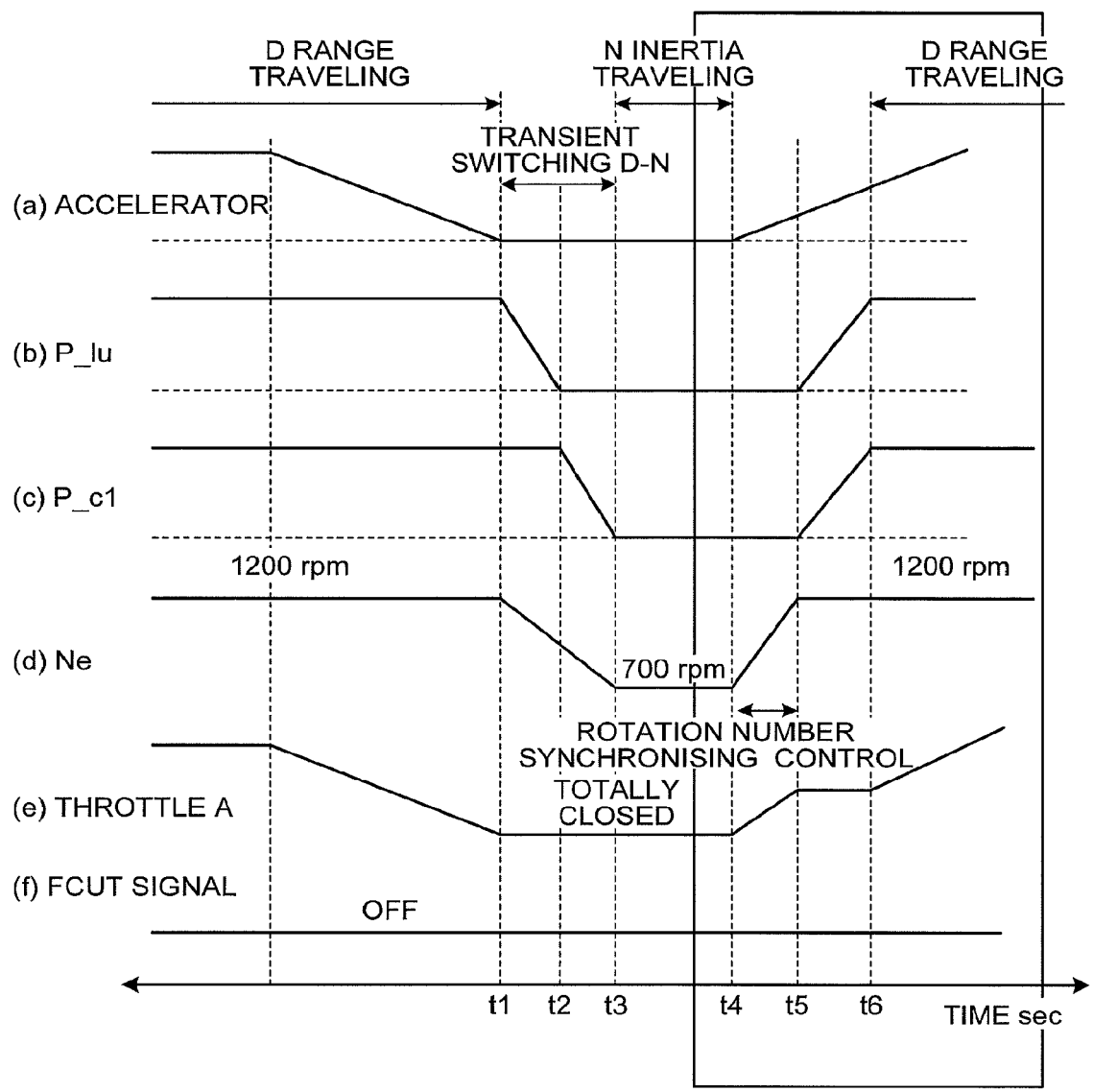
FIG. 4 is a time chart according to a first modification of the embodiment.

FIG. 4 is a time chart of control according to the first modification. In the modification, when the rotation number synchronizing control has been completed at time t5, the engaging operation of the clutch 36 and the engaging operation of the lock-up clutch 24 are carried out in parallel with each other. The start timing of the engaging operation of the clutch 36 and the start timing of the engaging operation of the lock-up clutch 24 may be the same timing or the start timing of the engaging operation of the clutch 36 may be prior to the start timing of the engaging operation of the lock-up clutch 24. Note that the start timing of the engaging operations of the clutch 36 and the lock-up clutch 24 may be determined so that the clutch 36 and the lock-up clutch 24 have been engaged at the same timing. Note that at least any one of the engaging operation of the clutch 36 or the engaging operation of the lock-up clutch 24 may be started before the rotation number synchronizing control has been completed.

Second Modification of the Embodiment

Figure 5:
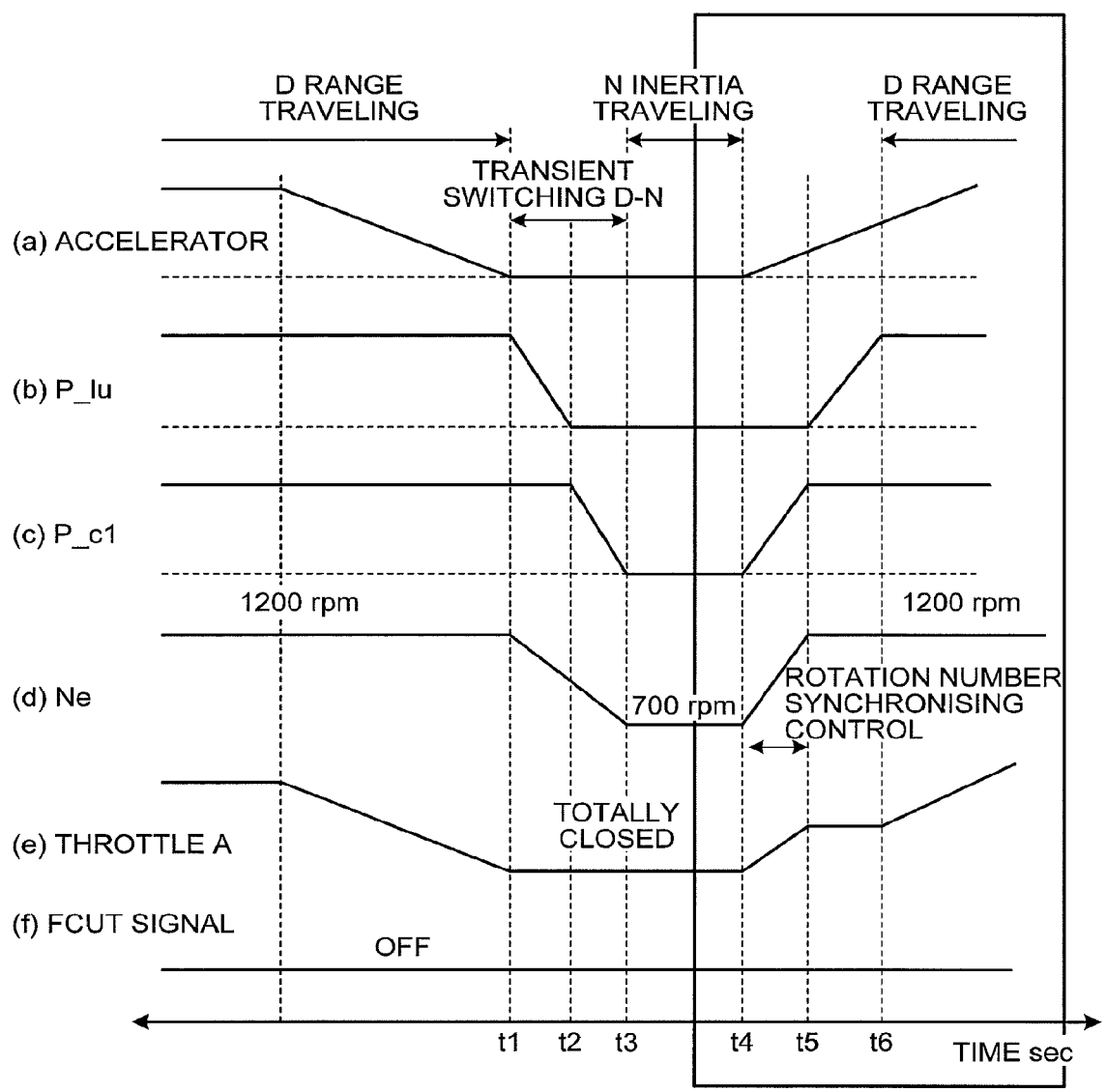
FIG. 5 is a time chart according to a second modification of the embodiment.

A second modification of the embodiment will be explained. In the modification, the rotation number synchronizing control and the engaging operation of the clutch 36 are carried out at the same time as quick control when the inertia traveling is shifted to the driven traveling. FIG. 5 is a time chart according to the second modification.

In the modification, when the accelerator is turned ON at time t4, the rotation number synchronizing control and the engaging operation of the clutch 36 are carried out in parallel with each other. The start timing of the rotation number synchronizing control and the start timing of the engaging operation of the clutch 36 may be the same timing or the start timing of the rotation number synchronizing control may be prior to the start timing of the engaging operation of the clutch 36. Note that the start timing of the rotation number synchronizing control and the start timing of the engaging operation of the clutch 36 may be determined so that the rotation number synchronizing control and the engagement of the clutch 36 have been completed at the same time.

When the rotation number synchronizing control and the engagement of the clutch 36 have been completed, respectively, the engaging operation of the lock-up clutch 24 is started. Note that the engaging operation of the lock-up clutch 24 may start prior to at least any one of the completion of the rotation number synchronizing control or the completion of engagement of the clutch 36.

Third Modification of the Embodiment

A third modification of the embodiment will be explained. In the modification, the rotation number synchronizing control and the engaging operation of the lock-up clutch 24 are carried out at the same time as quick control when the inertia traveling is shifted to the driven traveling.

In the modification, when the accelerator is turned ON during the inertia traveling, the rotation number synchronizing control and the engaging operation of the lock-up clutch 24 are carried out in parallel with each other. The start timing of the rotation number synchronizing control and the start timing of the engaging operation of the lock-up clutch 24 may be the same time or the start timing of the rotation number synchronizing control may be prior to the start timing of the engaging operation of the lock-up clutch 24. Note that the start timing of the rotation number synchronizing control and the start timing of the engaging operation of the lock-up clutch 24 may be determined so that rotation number synchronizing control and the engagement of the lock-up clutch 24 have completed at the same time.

In the state that the clutch 36 has been released, the rotation number difference between the turbine rotation number and the engine speed Ne is small and the load is small because the driving wheel 90 is isolated from the turbine runner 22. For this reason, the engaging operation of the lock-up clutch 24 can be completed in a shorter time than when the engaging operation is completed in the state that the clutch 36 has been engaged.

When the rotation number synchronizing control and the engagement of the lock-up clutch 24 have been completed, respectively, the engaging operation of the clutch 36 is started. Note that the engaging operation of the clutch 36 may be started prior to at least any one of the completion of the rotation number synchronizing control or the completion of engagement of the lock-up clutch 24.

Fourth Modification of the Embodiment

A fourth modification of the embodiment will be explained. In the modification, the rotation number synchronizing control, the engaging operation of the lock-up clutch 24, and the engaging operation of the clutch 36 are entirely carried out at the same time as quick control when the inertia traveling is shifted to the driven traveling.

In the modification, when the accelerator is turned ON during the inertia traveling, the rotation number synchronizing control, the engaging operation of the lock-up clutch 24, and the engaging operation of the clutch 36 are carried in parallel with each other. The start timing of the rotation number synchronizing control, the start timing of the engaging operation of the lock-up clutch 24, and the start timing of the engaging operation of the clutch 36 may be the same timing or may be appropriately different timing. Note that the start timing of the rotation number synchronizing control, the start timing of the engaging operation of the lock-up clutch 24, and the start timing of the engaging operation of the clutch 36 may be determined so that the rotation number synchronizing control, the engagement of the lock-up clutch 24, and the engagement of the clutch 36 are completed at the same time.

Fifth Modification of the Embodiment

A fifth modification of the embodiment will be explained. Selectively carrying out the quick control from the first modification to the fourth modification can make the responsiveness of the shift from the inertia traveling to the driven traveling variable. For example, the responsiveness requested by the driver may be estimated based on the accelerator opening degree and the accelerator operation speed when the accelerator is turned ON and any of the quick control is to be carried out may be determined so that the responsiveness is achieved. A larger accelerator opening degree and a larger accelerator operation speed can make it possible to estimate that the driver requests a higher degree of responsiveness. The selection of the quick control to be carried out according to the requested responsiveness can improve drivability.

Note that the each quick control is preferably pre-ranked in the order of a higher degree of responsiveness based on the result of an adaptation experiment and the like. The modification can make the suppression of shock compatible with responsiveness. Note that, in the embodiment and respective modifications, it is also possible to omit the rotation number synchronizing control.

Sixth Modification of the Embodiment

A sixth modification of the embodiment will be explained. In the embodiment and the respective modifications, when the inertia traveling and the driven traveling are switched, an auxiliary machine load of the engine 10 may be reduced. Since the auxiliary machine load is a disturbance for changing the torque of an engine shaft, there is a fear that the auxiliary machine load increases shock. Since the load of the engine 10 is reduced by reducing the auxiliary machine load, the shock generated when the power transmission path between the engine 10 and the driving wheel 90 is connected and disconnected is suppressed. As an auxiliary machine of the engine 10, for example, a compressor of an air conditioner and an alternator are exemplified.

The reduction of the auxiliary machine load includes to make the auxiliary machine load when the inertia traveling and the driven traveling are switched smaller than the auxiliary machine load before they starts to be switched and to make the auxiliary machine load when they are switching to a load smaller than a predetermined allowable load.

For example, generating a light load or no load state by forcibly stopping the load control of the auxiliary machine previously when the inertia traveling is shifted to the driven traveling can reduce the shock generated when the power transmission path is connected. Further, generating a light load or no load state by forcibly stopping the load control of the auxiliary machine previously when the driven traveling is shifted to the traveling can reduce the shock generated when the power transmission path is disconnected. Note that the load control of the auxiliary machine can be resumed after the inertia traveling and the driven traveling are completed.

Seventh Modification of the Embodiment

A seventh modification of the embodiment will be explained. The rotation number synchronizing control may be carried out before the return from the inertia traveling is determined. Previously carrying out the rotation number synchronizing control can improve the responsiveness when the inertia traveling is shifted to the driven traveling. When, for example, it is determined to carry out the inertia traveling at the time the accelerator opening degree is equal to or less than a predetermined opening degree, it is sufficient to determine whether or not the rotation number synchronizing control is carried out in the region of the accelerator opening degree less than the predetermined opening degree during the inertia traveling. When a threshold value (for example, 3%) less than the predetermined opening degree (for example, 5%) is determined, the rotation number synchronizing control can be carried out at the time the accelerator opening degree equal or more than the threshold value is detected.

Note that, in addition to the accelerator opening degree, whether or not the rotation number synchronizing control is carried out may be determined based on the accelerator operation speed. For example, even if the accelerator opening degree equal to or more than the threshold value is detected, the rotation number synchronizing control may not be carried out when the accelerator operation speed is small. Further, the threshold value may be made variable based on the accelerator operation speed. For example, the threshold value when the accelerator operation speed is large may be set to an opening degree smaller than the threshold value when the accelerator operation speed is small.

The contents disclosed in the embodiment and the respective modifications can be carried out by being appropriately combined.

REFERENCE SIGNS LIST 1-1 vehicle controller
1 vehicle
10 engine
20 torque converter
24 lock-up clutch
30 continuously variable transmission
36 clutch
50 ECU
90 driving wheel
flagD D range control flag
flagN N coasting control flag
P_lu lock-up supply hydraulic pressure
P_C1 clutch supply hydraulic pressure

The invention claimed is:

1. A vehicle controller comprising:
a lock-up clutch disposed to a power transmission path between an engine and a driving wheel; and
a clutch configured to connect and disconnect the power transmission path, wherein
a release start timing of the lock-up clutch is prior to a release start timing of the clutch at a time of switching from driven traveling for causing a vehicle to travel by connecting the power transmission path to inertia traveling for causing the vehicle to travel by disconnecting the power transmission path, or an engagement start timing of the clutch is made different from an engagement start timing of the lock-up clutch at a time of switching from the inertia traveling to the driven traveling is carried out, wherein the inertia traveling is carried out when an accelerator opening degree is set to a predetermined opening degree or less,
wherein engine speed of an engine of the vehicle in the inertia traveling is less than the engine speed in an idling state of the engine.

2. The vehicle controller according to claim 1, wherein
at the time of switching from the inertia traveling to the driven traveling, the engagement start timing of the clutch is prior to the engagement start timing of the lock-up clutch.

3. The vehicle controller according to claim 1, wherein
at the time of switching between the driven traveling and the inertia traveling, an auxiliary machine load of the engine is reduced.

4. The vehicle controller according to claim 3, wherein
At the time of switching from the inertia traveling to the driven traveling, the engagement start timing of the clutch is prior to the engagement start timing of the lock-up clutch.

5. A vehicle controller comprising:
A lock-up clutch disposed to a power transmission path between an engine and a driving wheel; and
a clutch configured to connect and disconnect the power transmission path, wherein
at least any one of that a release start timing of the lock-up clutch is made different from a release start timing of the clutch at a time of switching from driven traveling for causing a vehicle to travel by connecting the power transmission path to inertia traveling for causing the vehicle to travel by disconnecting the power transmission path, or an engagement start timing of the clutch is made different from an engagement start timing of the lock-up clutch at a time of switching from the inertia traveling to the driven traveling is carried out
and wherein
at the time of switching between the driven traveling and the inertia traveling, an auxiliary machine load of the engine is reduced.

6. A vehicle controller comprising:
a lock-up clutch disposed to a power transmission path between an engine and a driving wheel; and
a clutch configured to connect and disconnect the power transmission path, wherein
a release start timing of the lock-up clutch is prior to a release start timing of the clutch at a time of switching from driven traveling for causing a vehicle to travel by connecting the power transmission path to inertia traveling for causing the vehicle to travel by disconnecting the power transmission path, or an engagement start timing of the clutch is made different from an engagement start timing of the lock-up clutch at a time of switching from the inertia traveling to the driven traveling is carried out, wherein the inertia traveling is carried out when an accelerator opening degree is set to a predetermined opening degree or less,
wherein at the time of switching between the driven traveling and the inertia traveling, an auxiliary machine load of the engine is reduced.

7. The vehicle controller according to claim 6, wherein
at the time of switching from the inertia traveling to the driven traveling, the engagement start timing of the clutch is prior to the engagement start timing of the lock-up clutch.

* * * * *